United States Patent [19]

Welsh

[11] 4,456,693

[45] Jun. 26, 1984

[54] HYDROCRACKING CATALYST

[75] Inventor: William A. Welsh, Fulton, Md.

[73] Assignee: W. R. Grace & Co., New York, N.Y.

[21] Appl. No.: 486,089

[22] Filed: Apr. 18, 1983

Related U.S. Application Data

[63] Continuation-in-part of Ser. No. 356,127, Mar. 8, 1982, abandoned.

[51] Int. Cl.³ .............................................. B01J 29/12
[52] U.S. Cl. ...................................... 502/65; 502/66
[58] Field of Search ................ 252/455 Z; 502/65, 66

[56] References Cited

U.S. PATENT DOCUMENTS

| | | | |
|---|---|---|---|
| 3,407,148 | 10/1968 | Eastwood et al. ............... | 252/455 Z |
| 3,535,227 | 10/1970 | Kittrell ............................ | 252/455 Z |
| 3,546,100 | 12/1970 | Yan .................................. | 252/455 Z |
| 3,645,914 | 2/1972 | Rosinski et al. ................. | 502/65 |
| 3,836,594 | 9/1974 | Sampson et al. ................. | 252/420 |
| 3,957,689 | 5/1976 | Ostermaier et al. ............. | 252/455 Z |
| 4,372,930 | 2/1983 | Short et al. ...................... | 252/455 Z |

Primary Examiner—Delbert E. Gantz
Assistant Examiner—Lance Johnson
Attorney, Agent, or Firm—Arthur P. Savage

[57] ABSTRACT

A stable, highly active hydrocracking catalyst which contains a rare earth/noble metal exchanged ultrastable type Y zeolite dispersed in an inorganic oxide matrix. The catalyst is hydrated to a moisture level of from about 5 to 30 percent by weight $H_2O$ prior to activation and use in a hydrocracking process.

6 Claims, No Drawings

HYDROCRACKING CATALYST

This application is a continuation-in-part of U.S. Ser. No. 356,127 filed Mar. 8, 1982.

The present invention relates to the preparation of hydrocracking catalyst, and more specifically to hydrocracking catalysts which remain active over extended periods of use.

Hydrocracking catalysts which are used to crack hydrocarbon feedstocks in the presence of high pressure hydrogen at elevated temperature are generally evaluated on the capability to remain catalytically active for extended periods. A typical hydrocracking catalyst evaluation procedure involves subjecting the catalyst to hydrocracking conditions at a reaction temperature which yields a desired constant level of conversion. As the test is continued, the temperature of the reactor is increased by the amounts required to maintain the specific conversion specified for the period of the test. Catalysts which require a higher temperature to maintain the desired level of constant conversion at the end of the test (typically, 100 hours) are considered to be less active/stable than catalysts which require a lower temperature to maintain the same constant conversion.

U.S. Pat. Nos. 3,926,780 and 3,945,943 describe the preparation and use of hydrocracking catalysts which contain palladium and palladium/rare earth exchanged type Y zeolites. These references indicate that the palladium exchanged zeolites provide catalysts which are more active than catalysts which contain zeolites that are exchanged with a combination of palladium and rare earth ions.

Canadian Pat. Nos. 884,302, 980,325 and 1,037,456 indicate that highly active hydrocracking catalysts may be obtained by combining a Z14US ultrastable type Y zeolite with an inorganic oxide matrix. The references disclose catalysts which contain promoter metals such as palladium, and in additon refer to the use of zeolites which may contain rare earth ions.

U.S. Pat. Nos. 3,535,227, 4,107,031, and 4,002,575 describe the use and preparation of hydrocracking catalysts which are subjected to hydration prior to use. These references indicate that controlled hydration of the catalysts provides a higher level of activity.

While the prior art describes the preparation and use of hydrocracking catalysts which possess an acceptable level of activity and stability, it is noted that the catalysts are extremely expensive, particularly those which contain high levels of noble metals such as palladium and platinum. Accordingly, there is considerable interest in obtaining hydrocracking catalysts which remain stable and active for even longer periods of commercial use.

It is therefore an object of the present invention to provide improved hydrocracking catalyst compositions.

It is another object to provide a hydrocracking catalyst which is capable of maintaining a high level of conversion for extended periods of time.

It is another object to provide an improved noble metal containing hydrocracking catalyst which is resistant to deactivation when exposed to high temperatures for extended periods.

These and still further objects of the present invention will become readily apparent to one skilled in the art from the following detailed description and specific examples.

Broadly, my invention contemplates a hydrocracking catalyst which comprises a nobel metal/rare earth exchanged ultrastable type Y zeolite dispersed in an inorganic oxide matrix which has been rehydrated to contain from about 5 to 30 percent by weight moisture.

More specifically, I have found that a highly stable hydrocracking catalyst may be obtained by combining an ultrastable type Y zeolite (USY) which has been exchanged with from about 0.1 to 2.0 percent by weight palladium and from about 0.5 to 8 percent by weight rare earth ions (as $RE_2O_3$) with a suitable inorganic oxide matrix such as alumina, forming the mixture into particles of a desired size, calcining the particles to obtain required physical/chemical properties, and rehydrating the particles to a level of from about 5 to 30 percent by weight $H_2O$ prior to activation for use in a hydrocracking process.

The palladium/RE exchanged USY (Pd/RE USY) used in the preparation of the hydrocracking catalyst contemplated herein, are prepared by the following procedure:

(1) A sodium type Y zeolite (NaY) which possesses a silica to alumina ratio of about 4 to 6 and an initial sodium content of 10 to 15 weight percent (as $Na_2O$) is exchanged with an ammonium salt solution, such as ammonium sulfate, to a level of from about 3 to 4 weight percent $Na_2O$.

(2) The ammonium exchanged zeolite is then calcined in the presence of moisture at a temperature of from about 500° to 900° C.

(3) The calcined zeolite is then again exchanged with an ammonium salt to lower the $Na_2O$ content to below about 0.5 percent by weight, and preferably from about 0.05 to 0.2 percent by weight, and is subsequently washed with water to remove soluble salts.

(4) The zeolite is then rare earth exchanged with a solution of rare earth ions to impart a rare earth content of from about 1 to 8 percent by weight $RE_2O_3$ and is subsequently washed with water to remove soluble salts.

(5) The washed zeolite is then exchanged with a soluble palladium compound to impart a palladium content of from about 0.1 to 2.0 percent by weight.

The Pd/RE USY zeolite prepared by the above procedure is then combined with a suitable inorganic oxide matrix such as alumina, or silica-alumina hydrogel and formed into catalyst particles having a desired size and shape. Typically, the Pd/RE Y zeolite component will comprise from about 60 to 90 parts by weight of the finished catalyst, while the inorganic oxide matrix will comprise from about 40 to 10 parts by weight. The procedure used for preparing the catalyst particles involves mixing the zeolite with the inorganic oxide matrix such as alumina, then thoroughly blending the components in the presence of about 30 to 60 percent moisture to obtain a plastic mixture which is then formed into the desired particles using standard forming techniques such as extrusion, pilling or granulation. After forming, the particles are then subjected to a calcination (heating) step which is conducted at a temperature of from about 400° to 500° C., preferably in the presence of dry air, to obtain particles which contain from about 0.1 to 3.0 percent by weight moisture.

Subsequent to the calcination process and prior to activation and use in a hydrocracking process, the catalyst particles are subjected to a rehydration step which increases the moisture level of the catalyst particles to a level of about 5 to 30 percent by weight H₂O. The rehydration is conducted at at temperature of from about 25° to 50° C. using a suitable carrier gas such as air or nitrogen at greater than 10 percent relative humidity.

After rehydration the catalyst is ready for activation and use in typical hydrocracking processes. The activation procedure involves contacting the catalyst with dry hydrogen at a pressure of 1 to 150 atm at a temperature of 25° to 400° C. during which the moisture contacting the rehydrated catalyst is reduced to a level of about 0.5 to 2.5 wt. % H₂O. Subsequent to activation, a hydrocarbon feedstock is contacted with the catalyst at a temperature of from about 200° to 450° C. in the presence of hydrogen, which is maintained at a pressure of from about 50 to 150 atmospheres. The zeolite at this point has a unit cell dimension of about 24.45 to 24.55 A° as determined by standard x-ray diffraction analysis techniques. It is found that the present catalyst compositions may be subjected to standard hydrocracking conditions for extended periods while maintaining a high level of activity. The stability of the catalyst is apparently attributed to the stability of the zeolite component which is particularly resistant to dealumination at the elevated temperatures encountered during the hydrocracking process as evidenced by only a slow decrease in unit cell dimension. For example, when subjected to 100 percent steam at 2 atmospheres at 732° C. for 8 hours, the zeolite component of the catalyst will retain a unit cell of at least 24.30 A°.

Having described the basic aspects of the invention, the following examples are given to illustrate specific embodiments thereof.

EXAMPLE 1

An ultrastable type Y zeolite was prepared as follows:

A sodium type Y zeolite (cynthetic faujasite) having a silica to alumina ratio to 5 was subjected to exchange with an ammonium sulfate solution which contained 10 percent by weight ammonium sulfate at a temperature of 100° C. The exchange procedure was repeated until the zeolite contained 3.8 percent by weight Na₂O. The exchanged zeolite was then subjected to heating (calcination) at a temperature of 700° C. in the presence of steam. The calcined zeolite was then re-exchanged with the additional ammonium sulfate solution to obtain a calcined zeolite which contained 0.35 weight percent Na₂O. This product was then washed with water to remove soluble salts.

EXAMPLE 2

A hydrocracking catalyst which contained a palladium exchanged ultrastable type Y zeolite was prepared as follows.

An 800 g (dry basis) sample of the zeolite prepared by the method of Example 1 was slurried in water, and the pH of the mixture was adjusted to 9 by the addition of ammonium hydroxde. A palladium solution was prepared by combining 53 cc of solution containing 0.1 g Pd/cc with water and adjusting the pH of the solution to 9 by the addition of ammonium hydroxide. The palladium solution was then combined with the zeolite slurry and maintained at a temperature of 25° C. for a period of 1 hour with mixing. The exchanged zeolite was recovered by filtration and dried at a temperature of 160° C. in the presence of air. 800 g (dry basis) of the exchanged zeolite was then thoroughly mixed with 200 g of finely divided alumina and 400 g of water. This mixture was then extruded to obtain extrusions having a diameter of 0.3 cm and a length of 0.6 cm. The extrusions were then dried overnight at 160° C. and calcined in dry air for 2 hours at 260° C. followed by an additional heating for one hour at 482° C. The calcined extrudates which possess a moisture level of two percent by weight were then rehydrated by exposure to moist air until moisture content increased to a level of 5 percent by weight.

EXAMPLE 3

A catalyst sample which contained a palladium/rare earth exchanged ultrastable type Y zeolite was prepared as follows:

An 800 g sample of the ultrastable zeolite prepared in Example 1 was slurried in 10,000 g of water and hydrochloric acid was added to obtain a slurry having a pH of 4.5. A mixed rare earth chloride solution (46.4 percent lanthanum oxide, 26.9 percent cerium and 26.7 percent other) was added to the slurry which was then heated to a temperature of 60° C. for one hour with mixing. The exchanged zeolite was recovered by filtration and washed with water to remove chloride ions. The rare earth exchanged zeolite was then palladium exchanged and formed into hydrocracking catalyst extrusions and processed by the procedure set forth in Example 2.

The physical and chemical properties of the catalyst and examples prepared in Examples 2 and 3 are set forth in Table I below:

TABLE I

| Catalyst | Example 2 | Example 3 |
| --- | --- | --- |
| Surface Area (m²/g) | 520 | 660 |
| Unit Cell (Å) | 24.47 | 24.46 |
| Na₂O (wt. %) | 0.28 | 0.30 |
| Pd (wt. %) | 0.54 | 0.52 |
| RE₂O₃ (wt. %) | 0.1 | 1.9 |
| H₂O (wt. %) | 5 | 5 |

EXAMPLE 4

The catalyst samples obtained in Examples 2 and 3 were evaluated by the following procedure:

The samples were calcined in a flow of dried air in a muffle furnace having an initial temperature of 100° C. The temperature was increased by 37° C./hr to a final temperature of 537° C. which was maintained for a period of 16 hours. Both catalysts were then tested for the hydrocracking conversion of a gas oil feedstock which contained 5000 parts per million sulfur as thiophene under the following conditions: 1.7 weight hour space velocity (whsv): 92 atmospheres H₂, 1.4 standard m³ H₂/l of feed. The temperatures required to maintain 60 volume percent conversion of the gasoil to product which had a boiling point below 204° C. after 100 hours on stream is set forth in Table II below. No moisture was added to the system during the evaluation.

TABLE II

| Catalyst | Example 2 | Example 3 |
| --- | --- | --- |
| Temp (°C.) | 292 | 284 |

The data set forth in Table II indicates that the catalyst of the present invention, that is, the catalyst of Example 3, maintains better activity than the standard catalyst of Example 2.

EXAMPLE 5

To illustrate the hydrothermal stability of the catalysts of the present invention, the following test procedure was utilized:

Samples of catalysts of Examples 2 and 3 were placed in a steaming device and heated for 8 hours at 732° C. in 100 percent steam atmosphere maintained at two atmospheres. Subsequent to this treatment, the unit cell dimensions of the zeolites were measured using standard x-ray diffraction technique. Unit cell dimensions are set forth in Table III below:

TABLE III

| Catalyst | Example 2 | Example 3 |
|---|---|---|
| Unit Cell (Å) | 24.24 | 24.30 |

The above data shows a larger unit cell dimension for the catalyst of Example 3 (of the present invention). This indicates that less dealumination of the zeolite lattice has occurred as a result of hydrothermal deactivation. This resistance to hydrothermal deactivation indicates that the catalyst maintains a higher level of active acid sites during use.

EXAMPLE 6

A catalyst which contained a palladium/rare earth exchanged zeolite was prepared by the procedure set forth in Example 3. The catalyst was found to possess the physical/chemical properties set forth in Table IV.

TABLE IV

| | |
|---|---|
| Unit Cell (Å) | 24.5 |
| $Na_2O$ (wt. %) | 0.26 |
| Pd (wt. %) | 0.535 |
| $RE_2O_3$ | 1.88 |
| $H_2O$ (wt. %) | 2.1 |

A sample of the catalyst described in Table IV (Sample 6A) was maintained at the original 2.1 wt. % moisture level, while another sample (Sample 6B) was rehydrated to a total moisture level of 20 wt. % $H_2O$.

Both samples 6A and 6B were activated in a test unit by contact with flowing hydrogen at 92 atmospheres and increasing the temperature from 25° C. to 235° C. at a rate of 120° C./hr. The samples were held at 235° C. for 6 hours, then at 370° C. for 6 hours after increasing the temperature to 370° C. at a rate of 10° C./hour. Upon completion of the activation procedure the moisture level of Sample 6A was 2.1 wt. % $H_2O$ and of Sample 6B was 2.2 wt. % $H_2O$.

After cooling to 205° C., Samples 6A and B were evaluated using the hydrocracking catalyst test procedure set forth in Example 4. The results are summarized in Table V.

TABLE V

| Catalyst Sample | 6A | 6B |
|---|---|---|
| Original $H_2O$ Catalyst (wt. %) TV | 2.1 | 2.1 |
| $H_2O$ Content Prior to Activation (wt. %) | 2.1 | 20 |
| $H_2O$ Content after activation & Prior to Evaluation (wt. %) | 2.1 | 2.2 |
| Temperature (°C.) | 290 | 268 |

The data set forth in Table V indicates that the catalyst of the present invention (Sample 6B) has superior activity/stability chracteristics as compared to Sample 6A. It is believed that the state of palladium dispersion obtained by the procedure used to prepare Sample 6B (i.e. rehydration prior to activation) contributes to the enhanced activity.

The above Examples indicated that highly stable, viable hydrocracking catalysts may be obtained using the teachings of the present invention.

I claim:

1. A process for preparing hydrocracking catalyst which contains:
(1) a palladium/rare earth ultrastable type Y zeolite which contains from about 0.1 to 2 weight percent Pd and 0.5 to 8 weight percent $RE_2O_3$, (2) an inorganic oxide matrix and (3) from about 5 to 30 weight percent $H_2O$ comprising the steps:
   (a) forming said zeolite and matrix into catalyst particles;
   (b) drying said catalyst particles at a temperature of from about 400° to 600° C. to obtain particles having a moisture content below about 3 weight percent; and
   (c) rehydrating the catalyst particles prior to use in a hydrocracking process to obtain the moisture level set forth at (3).

2. A hydrocracking catalyst obtained by the process of claim 1.

3. The composition of claim 2 wherein said zeolite possesses a unit cell of from about 24.45 to 24.55 A°.

4. The catalyst of claim 2 which is further characterized by the ability to retain a unit cell size of at least 24.30 A° for a period of at least 8 hours when exposed to a temperature of 732° C. in the presence of 100 percent steam maintained at a pressure of two atmospheres.

5. The catalyst of claim 2 which contains from about 60 to 90 weight percent of said zeolite component.

6. The catalyst of claim 2 which is activated prior to use in a hydrocracking process by drying said rehydrated catalyst at a temperature of about 25° to 400° C. to a moisture level of about 0.5 to 2.5 weight percent $H_2O$.

* * * * *